United States Patent [19]
Graves et al.

[11] Patent Number: 4,737,853
[45] Date of Patent: Apr. 12, 1988

[54] SUPPRESSION CIRCUIT FOR VIDEO

[75] Inventors: Nancy D. Graves, Indianapolis; Terry W. Bunton, Martinsville, both of Ind.

[73] Assignee: RCA Corporation, Princeton, N.J.

[21] Appl. No.: 44,526

[22] Filed: Apr. 30, 1987

[51] Int. Cl.4 ............................................... H04N 5/63
[52] U.S. Cl. ..................................... 358/190; 363/21; 363/56
[58] Field of Search ......................... 358/190, 243, 74; 455/343, 217; 363/18-21, 56; 361/111, 58

[56] References Cited
U.S. PATENT DOCUMENTS

| | | | |
|---|---|---|---|
| 3,603,732 | 9/1971 | George | 358/190 |
| 4,118,739 | 10/1978 | Umehara | 358/190 |
| 4,234,829 | 11/1980 | Willis | 358/243 X |
| 4,321,513 | 3/1982 | Knight | 358/243 X |
| 4,323,961 | 4/1982 | Josephson | 363/21 X |
| 4,343,028 | 8/1982 | Hicks | 358/243 X |
| 4,345,275 | 8/1982 | Waybright | 358/243 |
| 4,466,051 | 8/1984 | Fitzgerald | 363/21 |
| 4,524,411 | 6/1985 | Willis | 363/21 |
| 4,562,508 | 12/1985 | Chen et al. | 358/243 X |
| 4,626,977 | 12/1986 | Carnes et al. | 363/21 |
| 4,656,573 | 4/1987 | Lee | 358/190 X |
| 4,658,342 | 4/1987 | Wharton | 363/21 |
| 4,692,852 | 9/1987 | Hoover | 358/190 X |

Primary Examiner—Howard W. Britton
Assistant Examiner—E. Anne Faris
Attorney, Agent, or Firm—Paul J. Rasmussen; Joseph J. Laks; Scott J. Stevens

[57] ABSTRACT

A switched mode power supply for a video apparatus having an electrically isolated chassis incorporates a switching FET that has its conduction interval controlled by pulses of varying frequency. An inductor is connected between the FET and hot ground to provide a low impedance path for line conducted interference signals generated by the switching of the FET and to provide a sufficient impedance path to prevent damage to the FET due to current flow caused by a high voltage discharge, such as a lighting strike to the cold ground referenced antenna.

3 Claims, 1 Drawing Sheet

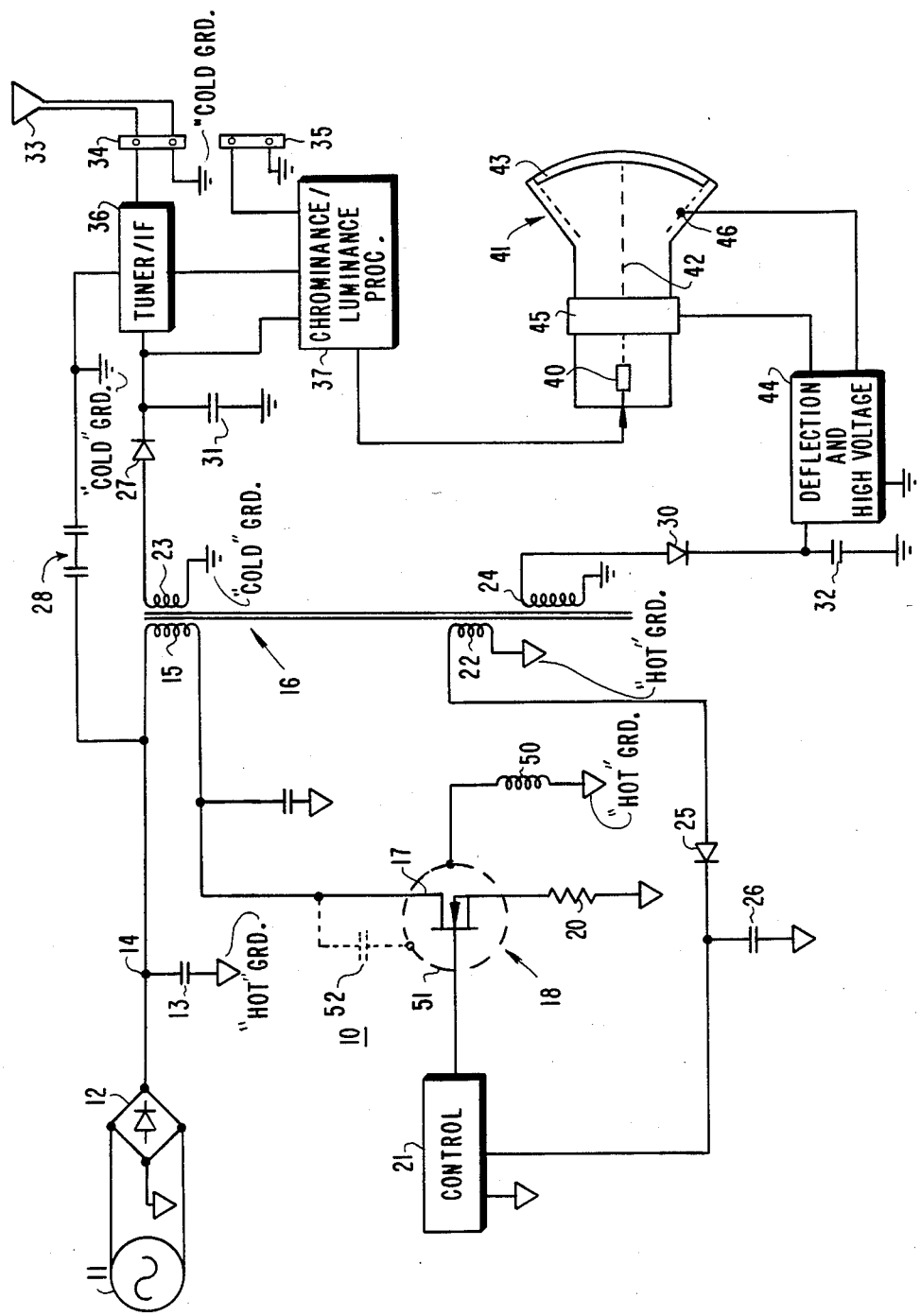

SUPPRESSION CIRCUIT FOR VIDEO

This invention relates to video apparatus and, in particular, to video apparatus having a switched mode voltage regulator.

The power supply of a video apparatus is required to provide stable regulated voltage levels for various load circuits of the video apparatus. Regulation of the load supplies must be maintained independent of changes in the load circuit power requirements and variations in the AC line voltage.

A switched mode power supply periodically applies an unregulated voltage level to a primary winding of a transformer by way of a switching device. The interval during which the unregulated voltage is applied is defined by controlling the conduction angle or interval of the switching device in order to carefully regulate the levels of the voltages developed across the secondary windings of the transformer. One form of switched mode power supply utilizes a high frequency switching device, such as a field effect transistor (FET), with both the conduction pulse width and frequency of the switching device being controlled. Switching of the FET may generate high frequency signals that can be conducted into the AC line and cause interference with other electrical devices operating on the same AC line. Such line conducted interference (LCI) must be carefully controlled in accordance with various regulations.

It is desirable that a video apparatus may incorporate direct video inputs, in order to be used as a computer monitor or to receive baseband video signals from a VCR, for example. Such direct video input terminals, or output terminals that may be used to connect external speakers, must be electrically isolated from the AC line. This may be accomplished by providing a first ground potential, to which the AC line and associated power supply components are referenced, and a second, isolated ground potential, to which the video and audio processing circuitry, for example, are referenced. During the occurrence of an externally applied high voltage impulse, such as that caused by an electrical discharge, such as lightning, the voltage potential separating the first and second ground potentials may be quite large, resulting in voltage stresses being applied to various components of the video apparatus.

In accordance with an aspect of the present invention, a power supply for a video apparatus comprises a source of unregulated voltage referenced to a point of first reference potential. A transformer comprises a first winding coupled to the unregulated voltage and a second winding, electrically isolated from the first winding, referenced to a point of second reference potential. A load circuit is coupled to the second winding and is subject to the external application of high voltage pulses that cause current to flow from the point of second reference potential to the point of first reference potential. A switch periodically energizes the first winding from the unregulated voltage source. The second winding becomes energized in response to the first winding energization in order to supply power to the load. Operation of the switch generates an interference signal at a first frequency. A frequency dependent impedance is coupled to the switch in order to provide a low impedance path to the point of first reference potential at the first frequency to attenuate the interference signal and to provide a path of significant impedance for reducing current flow from the point of second reference potential to the point of first reference potential through the switch during the application of the high voltage pulses in order to protect the switch.

In the accompanying drawing, the sole FIGURE illustrates a block and schematic diagram of a portion of a video apparatus incorporating a power supply in accordance with an aspect of the present invention.

Referring to the FIGURE, a video apparatus, such as a television receiver, includes a power supply 10 that derives power from an AC power source 11, such as an AC line supply. The AC signal from power source 11 is rectified by diode bridge circuitry 12 and filtered by capacitor 13 to provide a source of unregulated DC voltage at a terminal 14. This unregulated voltage is applied to one terminal of a primary winding 15 which forms part of a power transformer 16. The other terminal of primary winding 15 is connected to one terminal of a switching device, illustratively the drain terminal 17 of a field effect transistor (FET) 18. The source terminal of FET 18 is coupled through a resistor 20 to ground. The gate terminal of FET 18 is connected to control circuitry 21, which generates conduction switching pulses for FET 18. Switching of FET 18 causes current to flow in primary winding 15 which, by transformer action, acts to develop voltages across secondary winding 22, 23 and 24. The voltage developed across winding 22 is rectified by diode 25 and filtered by capacitor 26 to provide a feedback voltage that is applied to control circuit 21 in order to control the conduction angle or interval of FET 18. The voltages developed across secondary windings 23 and 24 are rectified by diodes 27 and 30, respectively, and filtered by capacitors 31 and 32, respectively, to provide DC supply levels for powering various load circuits of the video apparatus. The conduction interval of FET 18 is controlled in accordance with the feedback voltage developed across winding 22, as previously stated, in order to maintain accurate regulation of the load circuit supply voltages associated with secondary windings 23 and 24.

Transformer 16 provides electrical isolation between the primary side circuitry and the secondary side circuitry of transformer 16. Electrical isolation limits the maximum current that can flow between isolated components during normal operation of the video apparatus. The primary side circuitry includes winding 22 and the AC line supply and is reference to a point of first reference potential, identified in the FIGURE a "hot" ground and illustrated with a particular ground symbol. The secondary side circuitry, which includes windings 23 and 24, and any user accessible terminals or connectors, is referenced to a point of second reference potential, identified in the FIGURE as "cold" ground and illustrated by a different ground symbol. Capacitor pair 28 is connected across the isolation barrier developed by transformer 16 and provides noise suppression.

The video apparatus of the FIGURE illustratively receives a video input signal from an antenna 33 via an input terminal 34 as a modulated signal, or from an external source (not shown), such as a VCR, via an input terminal 35 as a direct video signal. User accessible input terminals 34 and 35 are illustratively shown as referenced to cold ground. The video signal from antenna 33 is applied to tuner and IF circuitry 36 which produces an output signal that is applied to chrominance and luminance processing circuitry 37. The direct video input signal via terminal 35 is also applied to chrominance and luminance processing circuitry 37.

Power for tuner and IF circuitry 36, and chrominance and luminance processing circuitry 37 is illustratively provided by the load circuit voltage supply associated with secondary winding 23. Circuitry 37 provides drive signals to the electron gun assembly 40 of a cathode ray tube (CRT) 41. Electron gun assembly 40 generates one or more electron beams 42 which are caused to impinge upon a phosphor display screen 43 located on the front panel of CRT 41. The load circuit voltage supply derived from the voltage developed across secondary winding 24 is utilized to provide power to a conventional deflection and high voltage generating circuit 44. Circuit 44 illustratively generates line and field rate deflection currents in the deflection windings of deflection yoke 45 located on the neck of CRT 41. The windings of deflection yoke 45 produce cyclically varying electromagnetic deflection fields that deflect or scan electron beam or beams 42 across display screen 43 is a predetermined pattern to form a raster. The intensity of the electron beam is controlled in accordance with the drive signals from chrominance and luminance processing circuitry 37 in order to produce a displayed video image. Circuitry 44 also generates a high voltage or ultor potential that is applied to CRT 41 via a terminal 46 to provide the high voltage or accelerating potential for electron beams 42.

Control circuit 21 produces switching pulses for FET 18 that can be made to vary in both pulse width and frequency. The frequency of the pulses may be of the order of 40 KHz to 60 KHz during normal operation of the video apparatus. This switching rate requires that FET 18 change conductive states quickly. The rapid switching of FET 18 may generate high frequency transient signals which may be conducted into the AC line supply. Operation of certain electrical or electronic devices, such as other video apparatus, for example, on the same AC line, may be disrupted as a result of this line conducted interference (LCI). To address this problem, the prior art provided a low impedance path to ground by utilizing a direct connection, via a wire, to ground in order to attenuate this signal.

Under some conditions, a lightning strike may cause a high voltage pulse to be applied to the antenna input of the video apparatus. This high voltage pulse will effectively raise the voltage level of the cold ground potential, creating a large voltage differential between the hot and cold ground potentials, which charges capacitor pair 28.

In accordance with an aspect of the present invention, a frequency dependent impedance component, shown as an inductor 50, is connected between hot ground and the heat sink on which FET 18 is mounted, illustrated by dashed line 51 in the FIGURE. Inductor 50 provides a low impedance path for the previously described line conducted interference, effectively attenuating the LCI signal. An insulator, such as mica, located between FET 18 and heat sink 51, effectively operates as a capacitor, and is illustratively designated as capacitor 52 in the FIGURE. A possible discharge path for capacitor pair 28 is through primary winding 15, and capacitor 52 to hot ground. A large current conduction along this path may result in damage or destruction of FET 18. The previously described wire to ground does not attenuate the high voltage pulse induced current flow sufficiently to prevent damage to the FET. The pulse nature of the high voltage signal applied to antenna 33 due to a lightning strike, for example, generates a discharge current having significant high frequency components, of the order of 20 MHz or greater. At frequencies of this magnitude, capacitor 52 appears relatively small, of the order of 27 pF, thereby providing a current discharge path from the drain of FET 18 via capacitor 52 and inductor 50 to ground. Inductor 50 provides a sufficient impedance to limit the current flow to a level that does not significantly harm FET 18. Inductor 50 is illustratively of the order of 0.6 $\mu$H. Physically, FET 18 is mounted on a metal heat sink, separated by a mica insulator. The case of FET 18 is connected via a spring clip to the heat sink.

What is claimed is:

1. A power supply for a video apparatus comprising:
  a source of unregulated voltage referenced to a point of first reference potential;
  a transformer comprising a first winding coupled to said source of unregulated voltage and a second winding electrically isolated from said first winding and referenced to a point of second reference potential;
  a load circuit coupled to said second winding, said load circuit subject to receiving an externally applied high voltage pulse, said high voltage pulse causing a current to flow from said point of second reference potential to said point of first reference potential;
  switching means coupled to said first winding for periodically energizing said first winding from said source of unregulated voltage, said second winding becoming energized in response to the energization of said first winding in order to supply power to said load circuit, the operation of said switching means generating an interference signal at a first frequency; and
  frequency dependent impedance means coupled to said switching means and to said point of first reference potential for providing a low impedance path to said point of first reference potential at said first frequency for attenuating said interference signal and providing a path of significant impedance for reducing current flow from said point of second reference potential to said point of first reference potential through said switching means during the application of said high voltage pulse in order to protect said switching means.

2. The arrangement defined in claim 1, wherein said switching means comprises a field effect transistor.

3. The arrangement defined in claim 1, wherein said frequency dependent impedance means comprises an inductor.

* * * * *